Aug. 23, 1960      S. C. RAYBON      2,949,897
ROTARY INTERNAL COMBUSTION ENGINE
Filed Dec. 4, 1959      6 Sheets-Sheet 1
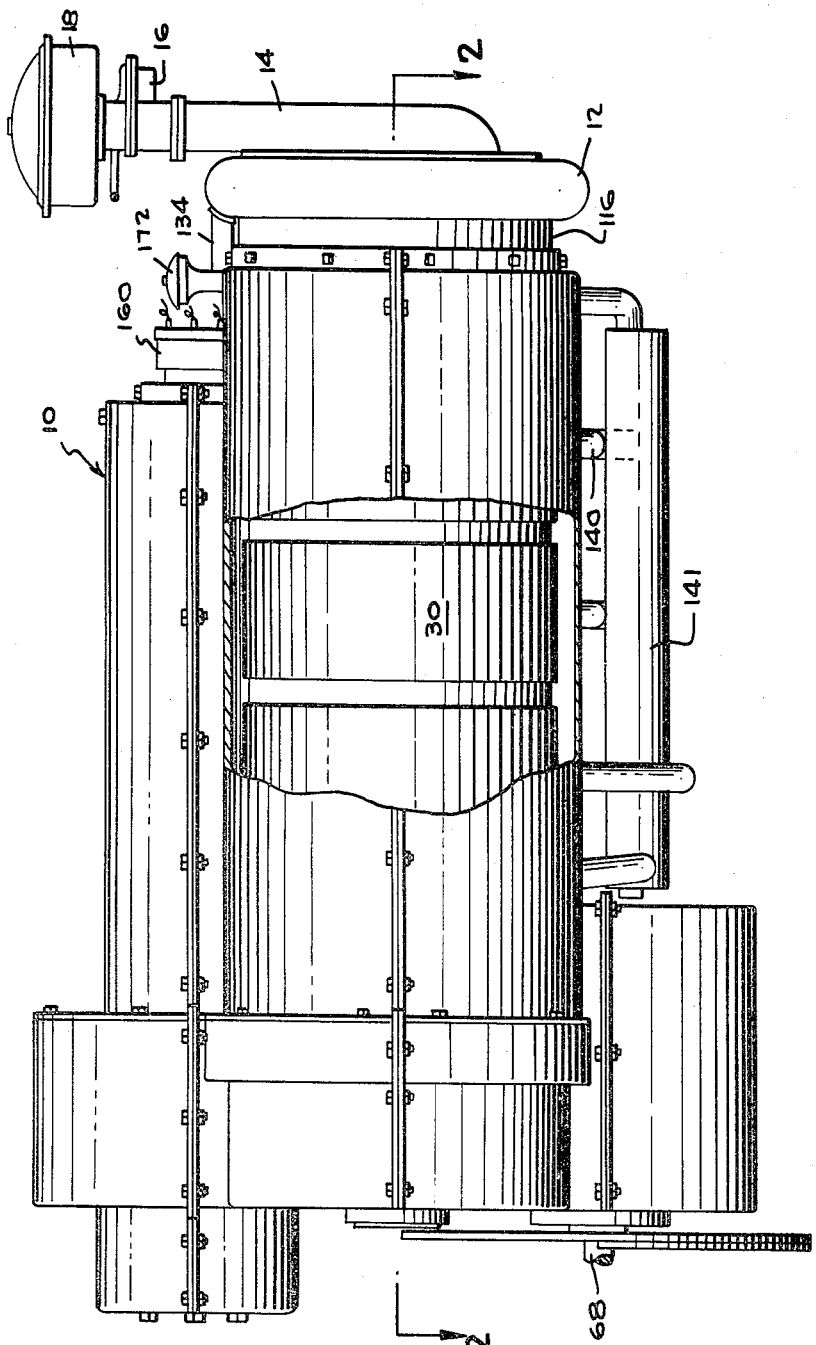
INVENTOR.
SIDNEY C. RAYBON
BY
McMorrow, Berman + Davidson
ATTORNEYS

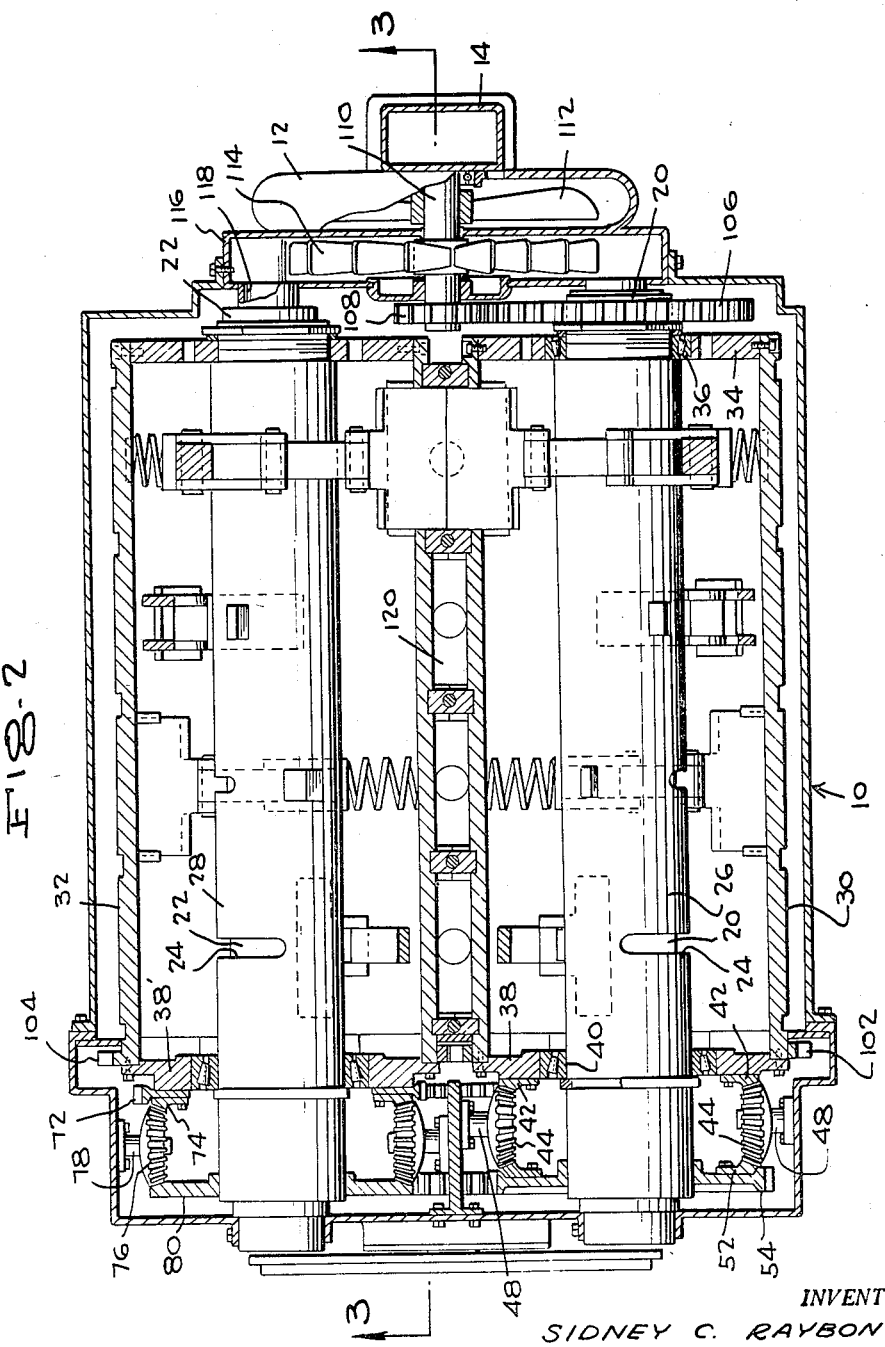

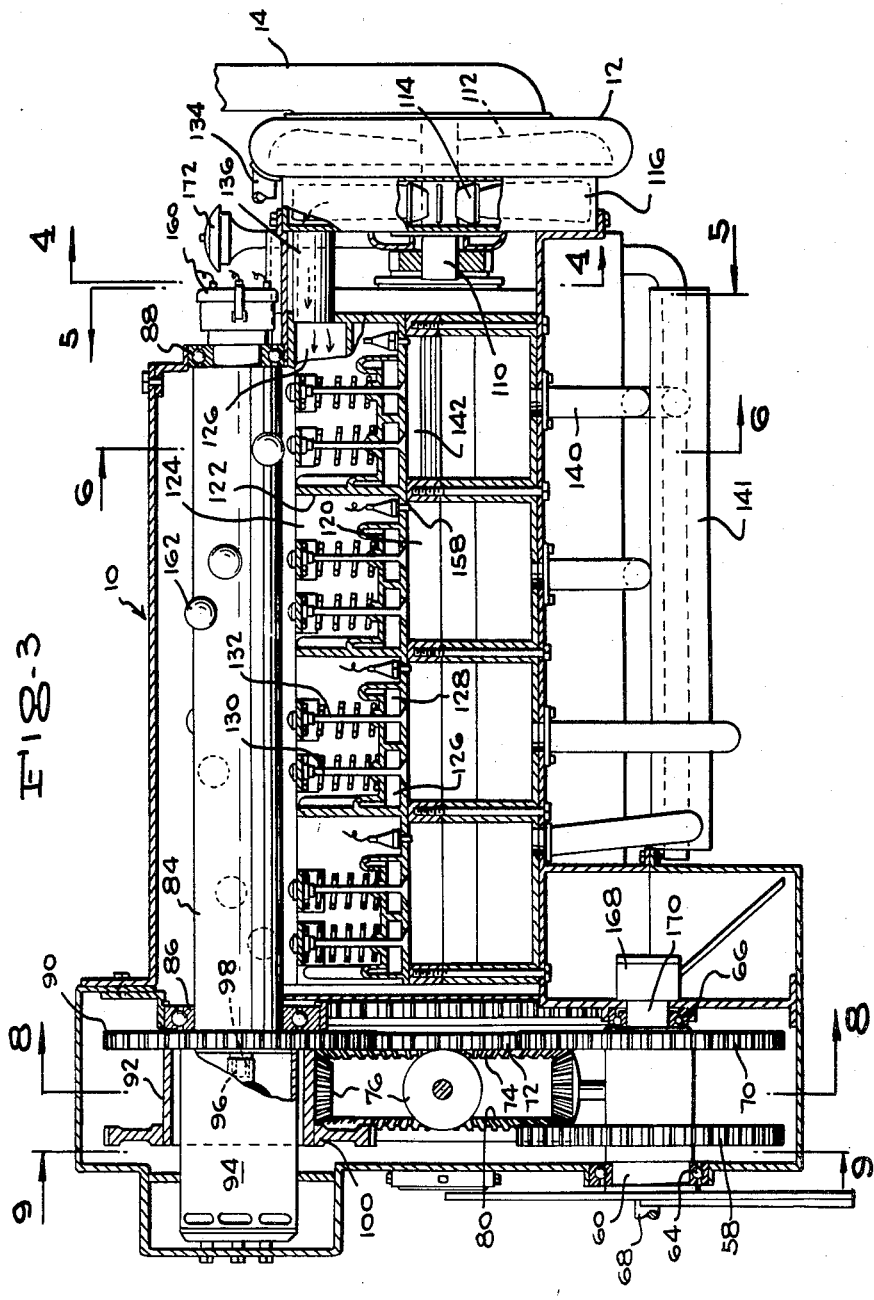

Aug. 23, 1960  S. C. RAYBON  2,949,897
ROTARY INTERNAL COMBUSTION ENGINE
Filed Dec. 4, 1959  6 Sheets-Sheet 4
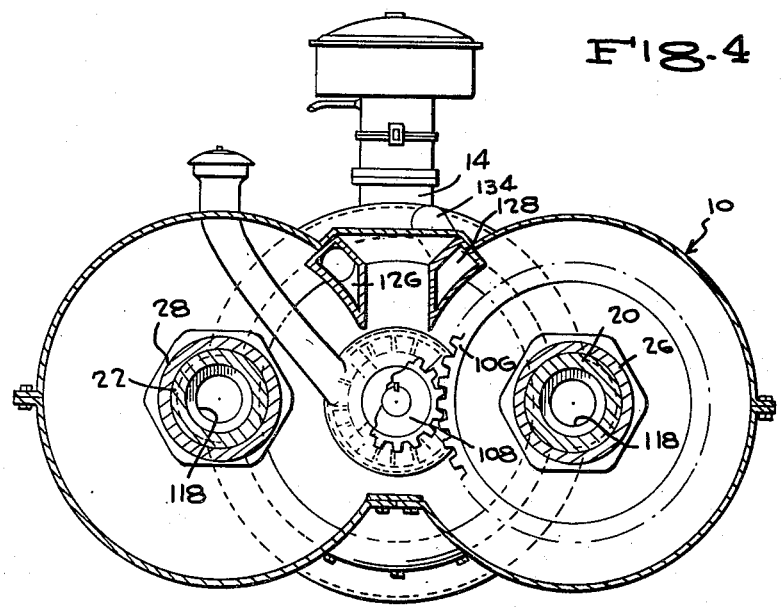
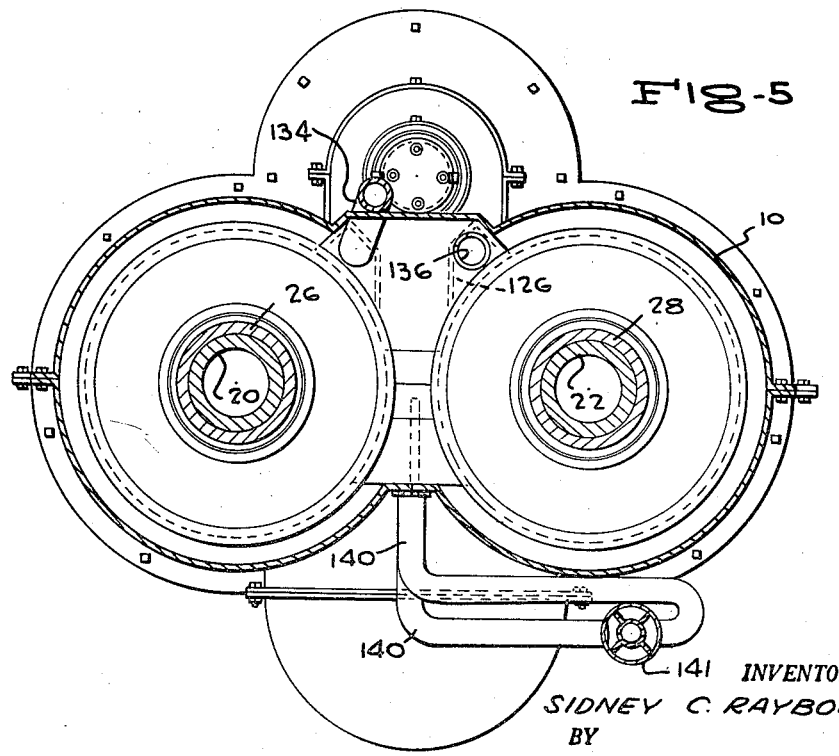
INVENTOR.
SIDNEY C. RAYBON
BY
McMorrow, Berman & Davidson
ATTORNEYS

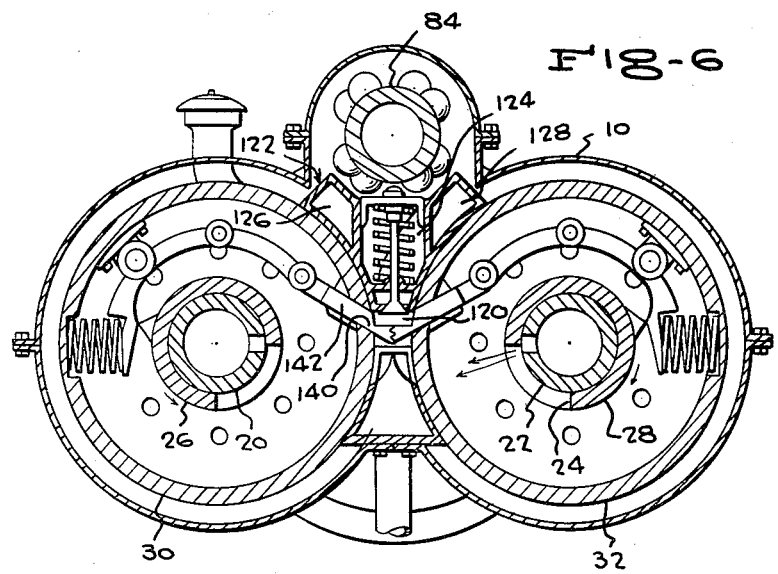
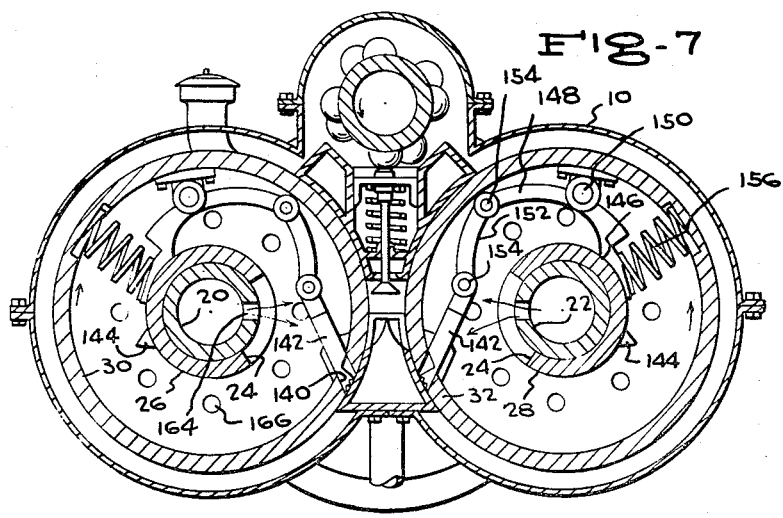

Aug. 23, 1960     S. C. RAYBON     2,949,897
ROTARY INTERNAL COMBUSTION ENGINE
Filed Dec. 4, 1959     6 Sheets-Sheet 6
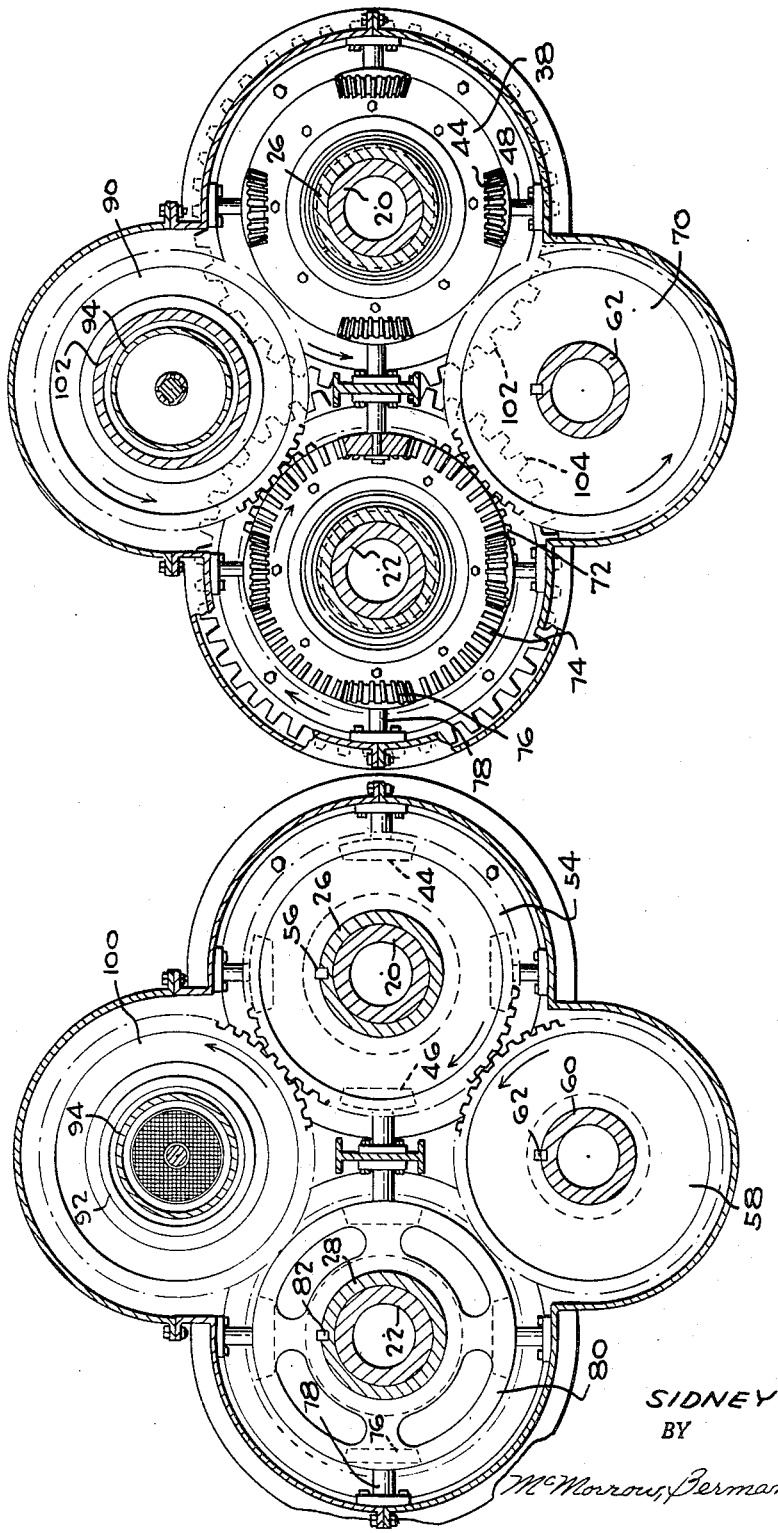
INVENTOR.
SIDNEY C. RAYBON
BY
McMorrow, Berman & Davidson
ATTORNEYS

2,949,897
ROTARY INTERNAL COMBUSTION ENGINE

Sidney C. Raybon, Box 142, Smithville, Ga.

Filed Dec. 4, 1959, Ser. No. 857,390

8 Claims. (Cl. 123—16)

The present invention relates to an internal combustion engine of the rotary type.

Rotary type internal combustion engines have been heretofore proposed and erected. Not all the engines proposed have been acceptable for various reasons. A principal common defect in the engines that have been proposed is that such engines have a multiplicity of parts with extensive opposed friction producing surfaces.

Another defect resides in the fact that the engines proposed fail to provide for exhaust back pressure and also fail to provide for scavenging air for the combustion chamber.

An object of the present invention is to provide a rotary type internal combustion engine which has a minimum of moving parts and a corresponding area of friction producing surfaces.

Another object of the present invention is to provide an internal combustion engine of the rotary type which has means for reducing to a minimum the exhaust back pressure, one having means for providing scavenging air to the combustion chambers and also to the interior of the engine for the purpose of cooling the same.

A further object of the present invention is to provide an internal combustion engine of simple structure, one sturdy in construction and having long life characteristics, and one which is highly effective in action.

These and other objects and advantages of the present invention will be fully apparent from the following description when taken in conjunction with the annexed drawings, in which:

Figure 1 is a side elevational view of the engine according to the present invention with a portion of the casing broken away to show one of the rotors;

Figure 2 is a view taken on the line 2—2 of Figure 1;

Figure 3 is a view taken on the line 3—3 of Figure 2;

Figure 4 is a view taken on the line 4—4 of Figure 3;

Figure 5 is a view taken on the line 5—5 of Figure 3;

Figure 6 is a view taken on the line 6—6 of Figure 3, showing the position of one of the valves in the combustion chamber prior to firing of the combustion chamber;

Figure 7 is a view similar to Figure 6 showing the valve in open position in the position of the rotary after firing of the combustion chamber;

Figure 8 is a view taken on the line 8—8 of Figure 3, and

Figure 9 is a view taken on the line 9—9 of Figure 3.

Referring in greater detail to the drawings in which like numerals indicate like parts throughout the several views, the reference numeral 10 designates generally a horizontally disposed elongated casing having at the forward end a supercharging housing 12 to which is secured an air inlet throat member 14 having on the upper end thereof a carburetor 16 and an air filter 18, as shown in Figure 1.

A pair of fixed shafts 20 and 22 are positioned within the casing 10 and are encircled by the casing 10, the shafts being arranged in lateral spaced relation and disposed horizontally. Only end portions of the shafts 20 and 22 are shown in Figure 2 although slots 24 in sleeves 26 and 28 which are circumposed about the shafts 20 and 22, respectively, expose mid portions of the shafts 20 and 22, respectively.

A pair of laterally spaced horizontally disposed rotors 30 and 32, rotatable in opposite directions, are circumposed about the sleeves 26 and 28, respectively, and are spaced therefrom, as shown most clearly in Figures 6 and 7.

As the means supporting the rotors 30 and 32 on the respective shafts 20 and 22 are identical they will be described with reference to the shaft 20 and rotor 30.

As shown in Figure 2, the rotor 30 has an end plate 34 supported by means of a bearing assembly 36 on the adjacent end of the sleeve 26. The other end of the rotor 30 has an end plate 38 supported by means of a bearing assembly 40 on the portion of the sleeve 26 inwardly of the other end of the latter. The face of the end plate 38 remote from the end plate 34 carries a ring gear 42 in mesh with a cluster of bevel gears 44 mounted on stub shafts 48 which are supported on the casing 10.

The bevel gears 44 are also in mesh with another ring gear 52 mounted upon one face of a pinion gear 54 fixedly secured to the sleeve 26 by a key 56 (Figure 9) and drivably in mesh with a main drive gear 58 carried upon the sleeve 60 and secured thereto by a key 62. The sleeve 60 is journaled in bearings 64 and 66 supported in the casing 10 (Figure 3) and is secured to a drive shaft 68 which projects from the rearward end of the casing 10.

Another drive gear 70 is mounted upon the sleeve 60 for rotation therewith and is in mesh with a spur gear 72 mounted upon the end plate 38' of the rotor 32, as shown in Figure 2. The spur gear 72 is interposed between a ring gear 74 and the rotor end plate 38', the ring gear 74 being in mesh with a cluster of bevel gears 76 rotatably mounted upon stub shafts 78 which are carried by the casing 10.

The bevel gears 76 are in mesh with a ring gear 80 fixedly secured by a key 82 to the sleeve 28 as shown in Figure 9.

An overhead cam shaft 84 is rotatably supported in bearings 86 and 88 carried by the rearward end and forward end of the casing 10, respectively. A spur gear 90 is fixedly secured to the cam shaft 84 adjacent the rearward end of the latter and is in mesh with, as shown in Figure 8, the spur gear 72 carried by the rotor 32. Projecting from the face of the spur gear 90 remote from the cam shaft 84 is a cylinder 92 encircling a generator assembly 94 (Figure 3) which has its drive shaft 96 splined, as at 98 in Figure 3, to a stub shaft which projects from the cam shaft 84.

On the free end of the cylinder 92 is a spur gear 100 mounted for rotation with the cam shaft 84 and in mesh with the pinion gear 54 carried by the sleeve 26, as shown in Figure 9.

Carried on the rearward end peripheral portions of the rotors 30 and 32 are spur gears 102 and 104, respectively, in mesh with each other and providing a positive means of driving the rotors 30 and 32 together without deviation from perfect alignment due to wear in the heretofore described gear train.

Referring to Figures 2 and 4, the forward end portion of the shaft 20 carries a spur gear 106 in mesh with another spur gear 108 carried upon a forwardly projecting shaft 110. The shaft 110 carries on its iforward end portion a supercharger blade assembly 112 and on its intermediate portion a compressor blade assembly 114. The supercharger blade assembly 112 rotates within the supercharger housing 14 and the compressor blade assembly 114 rotates within a compressor housing 116 carried on the forward end of the casing 10 between the housing 12 and the casing 10. The discharge ports 118 of the compressor housing 116 are in registry with and support the shafts 20 and 22 which are hollow as shown most clearly in Figures 4 and 5.

With particular reference to Figures 2, 3 and 6, within the casing 10 and between the adjacent and spaced peripheral portions of the rotors 30 and 32 is an open space or tunnel having its open ends opening towards and closed by the peripheral portions of the rotors 30 and 32, the tunnel being designated by the reference numeral 120. The open top of the tunnel 120 is closed by an intake manifold 122 which extends over the tunnel 120 and fills the space between the adjacent portions of the rotors 30 and 32. The intake manifold is divided into a valve chamber 124 and air conduits 126 and 128 on each side of the valve chamber 124.

As shown in Figures 2 and 3, there are four sections to the intake manifold 122, and four valve chambers 124 in which are operable two valves 130, 132, as shown in Figure 3.

The conduit 128 is connected by a pipe 134 to the end of the conduit 126 adjacent the forward end of the casing 10 and is connected in communication, by means of a port 136, with the interior of the compressor housing 116, as shown in Figures 3 and 5.

An exhaust manifold 138 is positioned so as to extend across and close the open bottom of each of the tunnels 120, each manifold 138 being connected by a pipe 140 to an exhaust collector 141, as shown in Figure 3.

Each of the rotors 30 and 32 is provided with an opening, as at 140 in Figures 6 and 7 with reference to the rotor 30. A blade 142 is normally nested within each of the rotors 30 and 32 adjacent each tunnel 120 and is connected to the rotor for projectile and retractile movements through the respective opening 140.

The blades 142 of the rotors 30 and 32, for each tunnel 120, upon execution of their projectile movements into the respective tunnel, have their free ends in contacting engagement, as in Figure 6 and form with the adjacent peripheral portions of the rotors 30 and 32 and the under face of the intake manifold 122, a combustion chamber into which the heads of the valves 130 and 132 project.

Cam means is carried upon each of the shafts 20 and 22 and is engageable with other cam means carried upon the adjacent blade 142 of each tunnel 120 of each of the rotors 30 and 32 for effecting the projectile movement of the blade 142 into the tunnel responsive to rotary movement of the respective rotor 30 or 32.

Specifically, this shaft cam means consists in a projection 144 carried on each of the sleeves 26 and 28 and engageable with a cam shoe 146 and one end of a lever 148 which is connected intermediate its ends by a bearing or pin 150 to the inner face of the respective rotor 30 and 32. The end of the lever 148 remote from the cam shoe 146 is pivotally connected to one end of the link 152 by means of a pin or bearing 154. The other end of the link 152 is connected by another pin or bearing 156 to the adjacent end of the blade 142.

Spring means is provided operatively connected to each of the blades 142 urging the blade 142 toward the retractile movement position. This means consists in a coiled spring 156 having one end bearing against the inner wall of the respective rotor 30 or 32 and the other end bearing against the adjacent cam shoe 146.

A spark plug 158 projects into each of the combustion chambers or tunnel 120 and is electrically in circuit with a distributor 160 driven by and carried on the forward end of the cam shaft 84.

Each of the valves 132 operates when engaged by the adjacent one of the valve depressors 162 carried on the cam shaft 84 to admit a charge of fuel and air mixture from the conduit 128 into the combustion chamber or tunnel 120.

Means is provided connecting each of the valves 132 to the adjacent rotor 30 or 32 so that the valve 132 effects in sequence its opening and closing movements upon simultaneous execution of the projectile movements of the blades 142 into the combustion chamber or tunnel 120. Specifically, this means includes the cam shaft 84, and the gear trains which connect each of the rotors 30 and 32 to the cam shaft 84. This gear train or gearing has the function of connecting each of the rotors together directly and also connecting each of the rotors to its respective sleeve and, by means of the bevel gear clusters, each of the sleeves to the drive gear 58 and the opposite rotor.

Each of the valves 130 is also driven by the valve depressor 162 in sequential operation with respect to the adjacent valve 132 for admitting scavenging air under pressure from the conduit 126 into the tunnel 120 for driving the combustion products out of the exhaust manifold 138 into the collector 141.

Scavenging air is also driven through the discharge ports 118 of the compressor housing 116 through the respective hollow shafts 20 and 22 and thence out of apertures 164 in each of the shafts 20 and 22 through the respective slots 24 of the adjacent sleeve 26 or 28 and thence into the interior of each of the rotors 30 or 32 for discharge therefrom through ports 166 formed in the end plates of the rotor 30 or 32.

A fuel pump 168 is positioned within the casing 10 below the combustion chambers or tunnels 120 and is driven by a shaft 170 operatively connected to the sleeve 60 and drive shaft 68. Suitable conduit means connects the fuel pump with the various wiring parts and gears of the engine, such conduit means not being shown for reasons of simplicity. One end of the collector 141 is open for attachment of a conduit means and suitable exhaust muffler, not shown.

The forward end of the casing 10 is provided with an inlet for lubricating oil, as at 172 in Figure 3.

In use, a source of current is applied to the distributor 160 and to the motor generator 94 and rotation of the rotors 30 and 32 in opposite direction is initiated with rotation of the supercharger blade assembly and the compressor blade assembly. As each set of blades 142 arrives at the contiguous end of the tunnel 120 and is projected thereinto by the action of the cam means, the ends of the respective pair of blades 142 meet and form the bottom of a combustion chamber against which is directed the force of the expanding or exploding gases of the fuel air mixture admitted through the conduit 128 and the associated valve 132 which executes its opening and closing movement sequentially to the movement of the blades 142 to their edge-contacting position.

The timing mechanism or distributor 160 now fires each of the spark plugs 158 in turn and the force of the exploding gases drives the blades 142 downwardly within each of the combustion chambers to impart rotation of the rotors 30 and 32 in opposite directions.

Scavenging air is admitted through each valve 130 and the products of combustion are driven into the exhaust manifold and thence to the collector 141. Scavenging air is driven at all times through the hollow shafts 20 and 22 and out of the end plates of the respective rotors.

The gearing and gear train which connect each of the rotors 30 and 32 directly together and also indirectly together through the driving means for the associated sleeves 26 and 28 provides an indirect drive for the drive shaft 68 to each rotor 30 and 32 as well as a direct drive of the drive shaft 68 by each rotor 30 and 32.

What is claimed is:

1. In an internal combustion engine, at least two rotors rotatable in opposite directions arranged in lateral spaced relation, an open-ended tunnel interposed between said rotors and having one open end contiguous to the periphery of one of said rotors and having the other open end contiguous to the periphery of the other of said rotors, there being an opening in the perimeter of each of said rotors, a blade housed within each of said rotors and connected to the adjacent rotor for projectile and retractile movement through said opening into and out of said tunnel responsive to rotary movement of said adjacent rotor, and an openable and closable valve for controlling the admission of a combustible mixture into said tunnel.

2. In an internal combustion engine, at least two rotors rotatable in opposite directions arranged in lateral spaced relation, an open-ended tunnel interposed between said rotors and having one open end contiguous to the periphery of one of said rotors and having the other open end contiguous to the periphery of the other of said rotors, there being an opening in the perimeter of each of said rotors, a blade housed within each of said rotors and connected to the adjacent rotor for projectile and retractile movement through said opening into and out of said tunnel responsive to rotary movement of said adjacent rotor, an openable and closable valve for controlling the admission of a combustible mixture into said tunnel, means connecting said valve to said rotors so that said valve effects in sequence its opening and closing movements upon simultaneous execution of the projectile movements of said blades into said tunnel.

3. In an internal combustion engine, at least two rotors rotatable in opposite directions arranged in lateral spaced relation, an open-ended tunnel interposed between said rotors and having one open end contiguous to the periphery of one of said rotors and having the other open end contiguous to the periphery of the other of said rotors, there being an opening in the perimeter of each of said rotors, a blade housed within each of said rotors and connected to the adjacent rotor for projectile and retractile movement through said opening into and out of said tunnel responsive to rotary movement of said adjacent rotor, said blades upon execution of the projectile movements into said tunnel having the free ends in contacting engagement and forming with the adjacent portion of said tunnel a combustion chamber, and an openable and closable valve for controlling the admission of a combustible mixture into said tunnel.

4. In an internal combustion engine, a pair of fixed shafts arranged in lateral spaced relation, at least one rotor circumposed about and mounted upon each of said shafts for rotation thereabout as an axis, said rotors being rotatable in opposite directions, an open-ended tunnel interposed between said rotors and having one open end contiguous to the periphery of one of said rotors and having the other open end contiguous to the periphery of the other of said rotors, there being an opening in the periphery of each of said rotors, a blade housed within each of said rotors for projectile and retractile movement through said opening into and out of said tunnel, cam means on each of said shafts and engageable with cam means carried by the adjacent blade for effecting the projectile movement of said blade into said tunnel responsive to rotary movement of said rotor, and an openable and closable valve for controlling the admission of a combustible mixture into said tunnel.

5. In an internal combustion engine, a pair of fixed shafts arranged in lateral spaced relation, at least one rotor circumposed about and mounted upon each of said shafts for rotation thereabout as an axis, said rotors being rotatable in opposite directions, an open-ended tunnel interposed between said rotors and having one open end contiguous to the periphery of one of said rotors and having the other open end contiguous to the periphery of the other of said rotors, there being an opening in the periphery of each of said rotors, a blade housed within each of said rotors for projectile and retractile movement through said opening into and out of said tunnel, cam means on each of said shafts and engageable with cam means carried by the adjacent blade for effecting the projectile movement of said blade into said tunnel responsive to rotary movement of said rotor, an openable and closable valve for controlling the admission of a combustible mixture into said tunnel, and spring means operatively connected to each of said blades urging the latter toward the retractile movement position.

6. In an internal combustion engine, a pair of fixed shafts arranged in lateral spaced relation, at least one rotor circumposed about and mounted upon each of said shafts for rotation thereabout as an axis, said rotors being rotatable in opposite directions, an open-ended tunnel interposed between said rotors and having one open end contiguous to the periphery of one of said rotors and having the other open end contiguous to the periphery of the other of said rotors, there being an opening in the periphery of each of said rotors, a blade housed within each of said rotors for projectile and retractile movement through said opening into and out of said tunnel, cam means on each of said shafts and engageable with cam means carried by the adjacent blade for effecting the projectile movement of said blade into said tunnel responsive to rotary movement of said rotor, an openable and closable valve for controlling the admission of a combustible mixture into said tunnel, means connecting said valve to said rotors so that said valve effects in sequence its opening and closing movements upon simultaneous execution of the projectile movements of said blades into said tunnel, and spring means operatively connected to each of said blades urging the latter toward the retractile movement position.

7. In an internal combustion engine, at least two rotors rotatable in opposite directions arranged in lateral spaced relation, an open-ended tunnel interposed between said rotors and having one open end contiguous to the periphery of one of said rotors and having the other open end contiguous to the periphery of the other of said rotors, there being an opening in the perimeter of each of said rotors, a blade housed within each of said rotors and connected to the adjacent rotor for projectile and retractile movement through said opening into and out of said tunnel responsive to rotary movement of said adjacent rotor, an openable and closable valve for controlling the admission of a combustible mixture into said tunnel, gearing connecting said rotors together for simultaneous rotation in opposite directions, a shaft to be driven adjacent said rotors, and a gear train connecting each of said rotors to said shaft.

8. In an internal combustion engine, a pair of fixed shafts arranged in lateral spaced relation, at least one rotor circumposed about and mounted upon each of said shafts for rotation thereabout as an axis, said rotors being rotatable in opposite directions, an open-ended tunnel interposed between said rotors and having one open end contiguous to the periphery of one of said rotors and having the other open end contiguous to the periphery of the other of said rotors, there being an opening in the periphery of each of said rotors, a blade housed within each of said rotors for projectile and retractile movement through said opening into and out of said tunnel, cam means on each of said shafts and engageable with cam means carried by the adjacent blade for effecting the projectile movement of said blades into said tunnel responsive to rotary movement of said rotor, an openable and closable valve for controlling the admission of a combustible mixture into said tunnel, gearing connecting said rotors together for simultaneous rotation in opposite directions, a shaft to be driven adjacent said rotors, and a gear train connecting each of said rotors to said shaft cam means.

No references cited.